(No Model.)

A. GOODSPEED.
HOBBY HORSE.

No. 244,586. Patented July 19, 1881.

Witnesses.
W. B. Hale.
Phil. W. Hale.

Inventor
Albert Goodspeed.
By Fred W. Royce
Attorney.

UNITED STATES PATENT OFFICE.

ALBERT GOODSPEED, OF HUBBARDSTON, MASSACHUSETTS.

HOBBY-HORSE.

SPECIFICATION forming part of Letters Patent No. 244,586, dated July 19, 1881.

Application filed June 2, 1881. (No model.)

*To all whom it may concern:*

Be it known that I, ALBERT GOODSPEED, a citizen of the United States, residing at Hubbardston, in the county of Worcester and State of Massachusetts, have invented certain new and useful Improvements in Hobby-Horses; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of hobby-horses in which the body of the horse is supported by a spring or springs, which allow it to have a resilient oscillating or rocking movement.

The fault with hobby-horses of this class as heretofore constructed is that they are perched too high for convenient mounting, the excessive height resulting from the necessity of using a long spring, usually placed vertically in order to permit the required amplitude of movement.

The object of my invention is to produce a hobby-horse having a convenient height for mounting, and having an agreeable forward and rearward rolling movement, in contradistinction to the oscillating movement upon a single pivot, as will be hereinafter particularly described.

Figure 1:
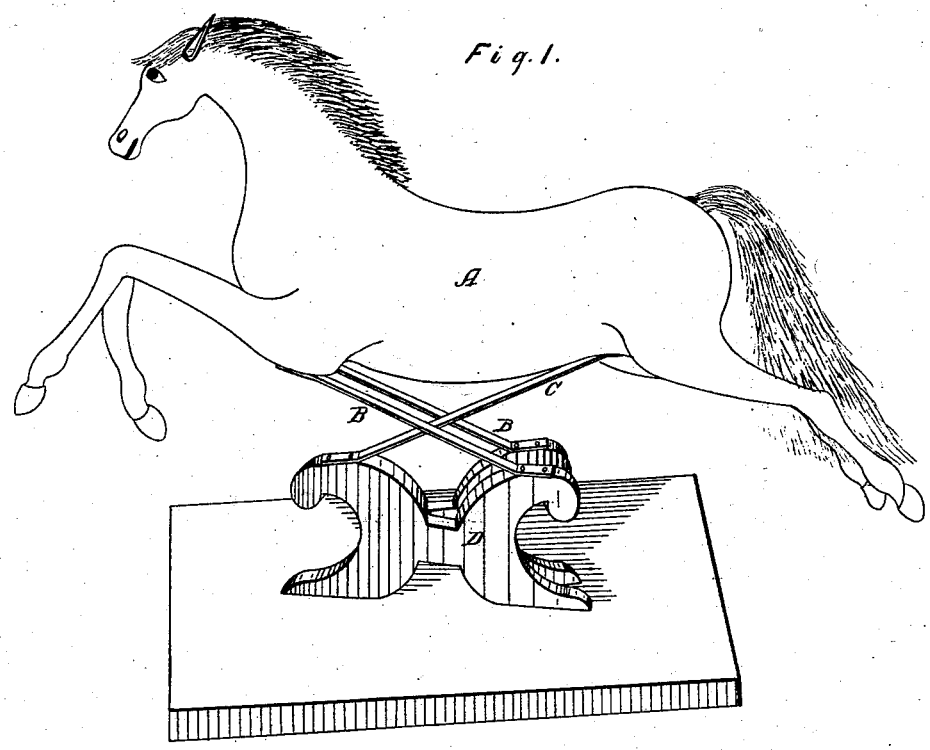
Figure 2:
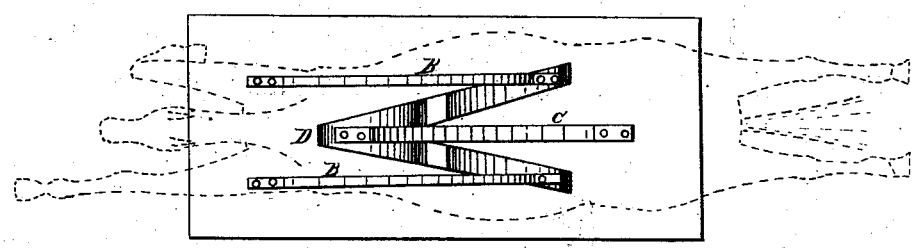

In the accompanying drawings, Figure 1 is a perspective view of a hobby-horse constructed according to my invention. Fig. 2 is a top view, with the body of the horse indicated in dotted lines.

The body of the horse A is supported directly by three leaf-springs, two of which, B B, have their lower ends firmly secured to the rear portion of the pedestal D, and extend obliquely forward and upward, having their upper ends secured to the body of the horse between his fore legs. The third spring, C, has its lower end firmly secured to the front portion of the pedestal, and extends obliquely rearwardly and upwardly, having its upper end firmly secured to the under side of the body of the horse just in front of his hind legs. The pedestal is of such a length that it lies between the fore and hind legs, and permits the horse's hoofs to come down near the floor or ground in his galloping movement, and also permits the body of the horse to be given a convenient rearward depression for mounting.

The galloping movement of the horse, it will be observed, approaches closely to that of an actual horse, being not about a single pivot; but as the forward portion of the horse rises the rear portion, as it sinks, also turns on the pivot which is formed by the upper end of spring C, and as the rear portion of the horse rises the forward portion, as it sinks, also turns somewhat on the pivot formed by the upper ends of the springs B B. In addition to its rolling movement the body of the horse has also a slight vertical vibration.

The devices for supporting the horse are extremely simple, consisting, as they do, of the three flat metallic leaf-springs and the pedestal, and are of the most durable character.

I do not limit myself, of course, to three springs, as any convenient number might obviously be employed.

I am aware that the body of a hobby-horse has been supported by rigid bars, crossed similarly to the springs in my invention, under the body of the horse, and having their upper ends pivoted, respectively, to the front and rear ends of the horse, while their lower ends are pivoted to a suitable base, and I do not claim such invention.

What I claim is—

1. In a hobby-horse, the combination, with the body of the horse, of the supporting-springs having their upper ends respectively secured to forward and rearward portions of the body of the horse, and extending downward, crossing each other, and having their lower ends secured to a suitable pedestal, substantially as described.

2. The combination, with the body of the horse, and the pedestal standing entirely between the fore and hind legs thereof, of the springs B, having their upper ends secured to the forward portion of the under side of the horse, and extending rearwardly and downwardly to the pedestal, and the spring C, having its upper end secured to the rear portion of the under side of the horse, and extending forwardly and downwardly to the pedestal, substantially as described.

In testimony whereof I have affixed my signature in presence of two witnesses.

ALBERT GOODSPEED.

Witnesses:
JOHN GOODSPEED,
L. W. GOODSPEED.